United States Patent
Xiang

(10) Patent No.: US 9,053,023 B2
(45) Date of Patent: Jun. 9, 2015

(54) FAULT-TOLERANT SYSTEM, FAULT-TOLERANT METHOD AND PROGRAM

(71) Applicant: Jianwen Xiang, Tokyo (JP)

(72) Inventor: Jianwen Xiang, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/360,980

(22) PCT Filed: Nov. 27, 2012

(86) PCT No.: PCT/JP2012/080637
§ 371 (c)(1),
(2) Date: May 28, 2014

(87) PCT Pub. No.: WO2013/080977
PCT Pub. Date: Jun. 6, 2013

(65) Prior Publication Data
US 2014/0325280 A1  Oct. 30, 2014

(30) Foreign Application Priority Data
Nov. 28, 2011  (JP) .................................. 2011-258434

(51) Int. Cl.
G06F 11/07  (2006.01)
(52) U.S. Cl.
CPC .......... G06F 11/079 (2013.01); G06F 11/0709 (2013.01); G06F 11/0775 (2013.01)

(58) Field of Classification Search
CPC .............. G06F 11/0709; G06F 11/079; G06F 11/0775; G06F 11/2023; G06F 11/1641; G06F 11/1658; G06F 11/184; G06F 11/2025; G06F 11/2028; G06F 11/2048
See application file for complete search history.

(56) References Cited

U.S. PATENT DOCUMENTS

| 6,073,251 | A  | * | 6/2000 | Jewett et al. ................. 714/6.32 |
| 6,697,756 | B2 | * | 2/2004 | Wettstein et al. ............. 702/122 |
| 7,412,352 | B1 | * | 8/2008 | Fagerstrom ................... 702/186 |

FOREIGN PATENT DOCUMENTS

| JP | 5-143570 A | 6/1993 |
| JP | 2000-235507 A | 8/2000 |
| JP | 2003-345620 A | 12/2003 |
| JP | 2008-102562 A | 5/2008 |
| JP | 2010-237855 A | 10/2010 |

OTHER PUBLICATIONS

Suprasad V. Amari et al., "Imperfect Coverage Models: Status and Trends", Handbook of Perfoemability Engineering, 2008, pp. 321-348, Chapter 22.
International Search Report for PCT/JP2012/080637 dated Jan. 15, 2013.

* cited by examiner

*Primary Examiner* — Nadeem Iqbal
(74) *Attorney, Agent, or Firm* — Sughrue Mion, PLLC

(57) ABSTRACT

The present invention is a fault-tolerant system comprising: system failure logic means for editing system failure logic; and irrelevant component coverage means for identifying irrelevant components not having an effect on the system failure logic and isolating the irrelevant components based on the system failure logic provided by the system failure logic means.

6 Claims, 4 Drawing Sheets

FIG. 3

Given a logic formula $f$ representing the fault logic of a system with perfect coverage, a basic event (variable) $b_i$ of $f$ is said to be irrelevant in $f$ if and only if
$$f_{\{b_i=0\}} \equiv f_{\{b_i=1\}},$$
where $f_{\{b_i=0\}}$ (resp. $f_{\{b_i=1\}}$) denotes the formula obtained from $f$ by substituting 0 (resp. 1) for all occurrences of $b_i$ in $f$, and $\equiv$ stands for

FAULT-TOLERANT SYSTEM, FAULT-TOLERANT METHOD AND PROGRAM

CROSS REFERENCE TO RELATED APPLICATIONS

This application is a National Stage of International Application No. PCT/JP2012/080637, filed Nov. 27, 2014, claiming priority for Japanese Patent Application No. 2011-258434, filed Nov. 28, 2011, the contents of all of which are incorporated herein by reference in their entirety.

TECHNICAL FIELD

The present invention relates to a system, a method, and a program for management of a fault-tolerant system.

BACKGROUND ART

A fault-tolerant system is usually designed to handle most of the faults in the system by using concepts such as redundancy. An uncovered component fault may lead to a system or subsystem failure even when adequate redundancy exists. Automatic recovery and reconstruction mechanisms, including fault detection, location, and isolation, play an important role in implementing fault tolerance. The models that consider the effects of imperfect fault coverage are known as imperfect coverage models (IPCM), or simply coverage models (CM).

According to the types of fault-tolerant techniques used in the error handling mechanism, coverage models are generally classified into as component level fault models and system level reliability/dependability modes. The component level fault models are used for a particular behavior of a system in response to a fault in each component. If the identification and recovery process of a fault component utilizes its built-in test (BIT) capability, it is called an element-level coverage model.

In the element-level coverage model, if a fault of a component is not covered, it may lead to a system failure and called a single-point failure (or uncovered failure).

A literature introducing the conventional imperfect coverage models is provided in NPL 1.

The conventional imperfect coverage model, especially, the element-level coverage model, only considers the identification and isolation of faulty components. A common assumption is that any component may result in a single-point failure to the system if it has not been safely isolated from the system.

Given a system, it may contain some irrelevant components whose status (operational or failed but covered) does not affect the system if the fault coverage is perfect. A component could be initially irrelevant in the system, and an initially relevant component could become irrelevant afterwards due to the reconfiguration caused by the failures of other components. However, if the fault coverage is imperfect, an uncovered fault of the irrelevant component may still lead to a system failure and become a single-point failure. In such a case, it is important to identify and isolate the irrelevant components in addition to the faulty components, which can significantly improve system reliability by preventing the potential future uncovered failures from the irrelevant components.

CITATION LIST

Non Patent Literature

NPL 1: S. V. Amari, A. F. Myers, A. Rauzy, and K. S. Trivedi, "Imperfect coverage models: status and trends," in Handbook of Performability Engineering, Chapter 22, Springer, 2008, pp. 321-348.

SUMMARY OF INVENTION

Technical Problem

However, the conventional coverage model, represented by the one in PTL 1, has a problem that system reliability can be deteriorated by the single-point failure induced by the irrelevant component. This is because the identification and isolation of irrelevant components is not considered in the conventional coverage model, represented by the one in PTL 1, in spite of the fact that an uncovered fault of the irrelevant component may result in an uncovered (single-point) failure in the system.

The present invention has thus been made in view of such a problem, and its object is to provide a technology with which reliability of a whole system can be improved by providing a method and a system for identifying and isolating irrelevant components in order to prevent future uncovered failures from the irrelevant components.

Disclosure of the Invention

The present invention is a fault-tolerant system comprising: system failure logic means for editing system failure logic; and irrelevant component coverage means for identifying irrelevant components not having an effect on said system failure logic and isolating the irrelevant components based on said system failure logic provided by said system failure logic means.

The present invention is a fault-tolerant method comprising: editing and providing system failure logic; and identifying irrelevant components not having an effect on said system failure logic and isolating said irrelevant components based on said system failure logic.

The present invention is a program for a fault-tolerant system, said program causing a computer to execute: system failure logic processing of editing system failure logic; and irrelevant component isolation processing of identifying irrelevant components not having an effect on said system failure logic and isolating said irrelevant components based on said system failure logic.

Advantageous Effects of Invention

An effect of the present invention is that irrelevant components can be identified and isolated in time in any system states to prevent future uncovered (single-point) failures from the irrelevant components, and as a result, reliability of the whole system can be improved.

BRIEF DESCRIPTION OF DRAWINGS

FIG. 3 shows an exemplary definition of an irrelevant component (irrelevant event).

DESCRIPTION OF EMBODIMENTS

Next, an embodiment of the present invention will be described in detail with reference to the accompanying drawings.

Figure 1:
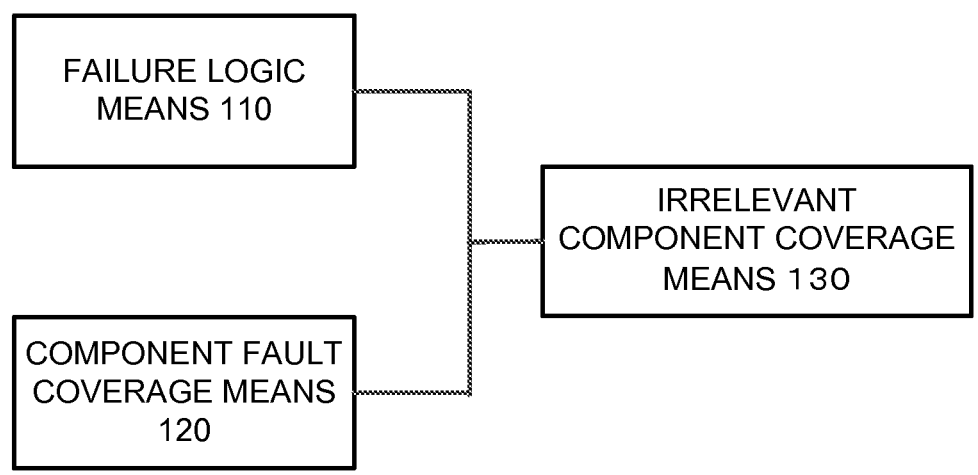
FIG. 1 is a block diagram showing a configuration of an embodiment of the present invention.

As shown in FIG. 1, the first embodiment of the present invention comprises failure logic means 110, component fault coverage means 120, and irrelevant component coverage means 130.

These means operate as generally described below:

The failure logic means 110 edits system failure logic with the assumption of perfect coverage, i.e., the logic representing the combinations of covered component failures that may lead to system failure, and saves resulting logic. The failure logic is saved in the format of a reliability model, for example, a fault tree, a reliability block diagram, binary decision trees, and pure logic formulas.

The component fault coverage means 120 performs detection, recovery and isolation of component faults, and reconfiguration of the system under the occurrence of a covered component failure.

The irrelevant component coverage means 130 performs the identification and isolation of irrelevant components based on the system failure logic provided by the failure logic means 110 and information on the occurrence of the covered component failures provided by the component fault coverage means 120.

Figure 2:
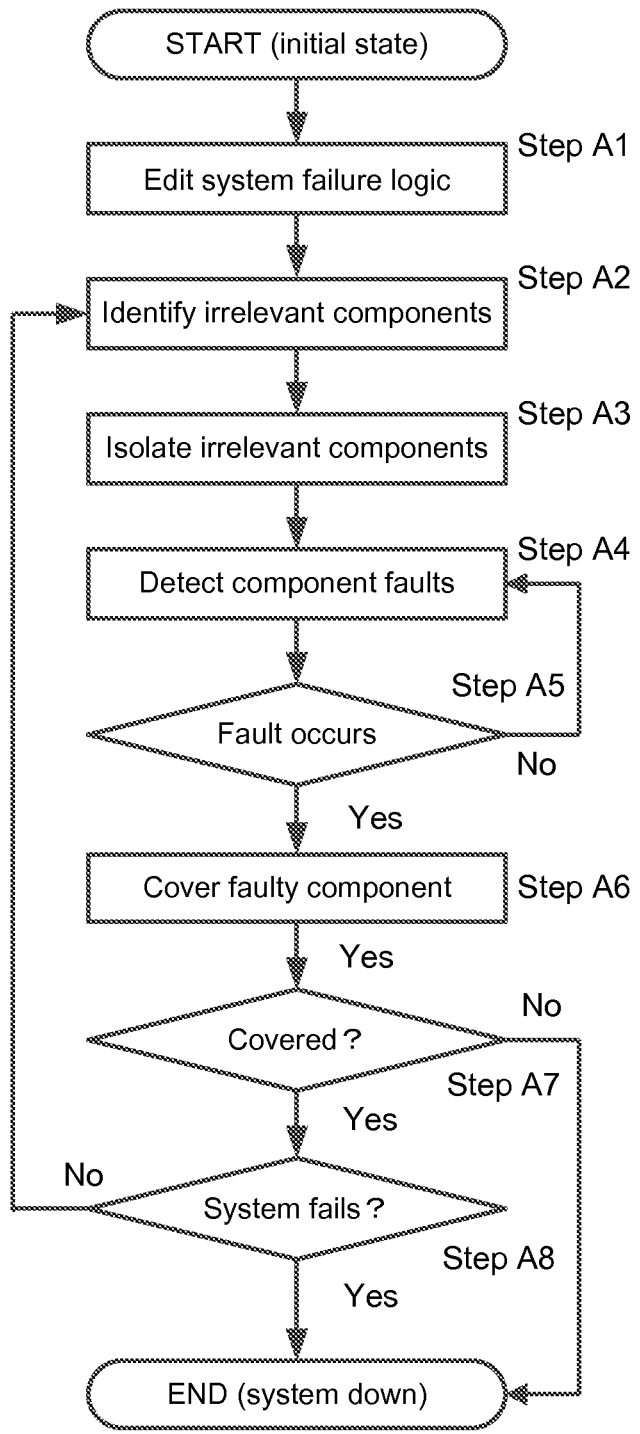
FIG. 2 is a flow chart showing an operation of the embodiment of the present invention.

Next, a general operation of the present embodiment will be described in detail with reference to FIG. 1 and a flow chart in FIG. 2.

First, system failure logic is edited (generated) by the aforementioned failure logic means 110 (Step A1). The system failure logic is composed of all the possible combinations of covered component failures that may cause the system to fail. The system failure logic can be represented by a reliability model, such as, a fault tree, a reliability block diagram, and a pure logic formula. The system failure logic is analyzed without consideration of imperfect coverage, i.e., with perfect coverage.

In the initial system state with the system failure logic, the initially irrelevant components are identified (Step A2) and isolated from the system (Step A3) by the irrelevant component coverage means 130.

Logically speaking, let f be a logic formula representing the system failure logic, a component (basic event) $b_i$ is said to irrelevant in f if and only if $$f_{[bi=0]} \equiv f_{[bi=1]},$$

where $f_{[bi=v]}$ denotes the formula f in which the constant v ($v \in \{0,1\}$) has been substituted for all occurrences of $b_i$. and the symbol $\equiv$ stands for the logical equivalence. In other words, $b_i$ is irrelevant in f if and only if f does not depend on the values of $b_i$. For convenience, we use the same symbols to denote components and their corresponding basic (fault) events. The definition is presented in FIG. 3.

To make the concept of irrelevant component more understandable, a concrete example will be described. For example, assume that the failure logic f of a system is given by $$f = a \lor a \land b,$$

where a and b denote basic events (components). In this case, b is obviously an irrelevant component because $$f_{[b=0]} = a = f_{[b=1]},$$

and should be isolated from the system to prevent its potential uncovered (single-point) failures.

In a case that the system failure logic is initially coherent, such as a coherent fault tree without negation gates and irrelevant events, the identification and isolation of irrelevant components may be omitted in the initial state.

During system maintenance, the system periodically detects component faults by the component fault coverage means 120 (Step A4). If a fault is detected (Step A5, Yes), the system tries to cover the faulty component by the component fault coverage means 120 (Step A6). The coverage of fault components can be performed as proposed by the conventional imperfect coverage model described in NPL 1.

In a case that the fault is covered as a permanent component failure (Step A7, Yes), and the system is operational after the coverage and reconfiguration (Step A8, No), the identification of irrelevant components is performed under the occurrence of the covered component failure, and the irrelevant components are isolated from the system (Steps A2 and A3 are repeated).

On the other hand, the covered component failure may cause the system to fail according to the system failure logic (typically by running out of redundancy) (Step A8, Yes), the system goes down. Alternatively, if the fault cannot be covered (Step A7, No), an uncovered (single-point) failure occurs and the system goes down.

Next, an operation of the present invention will be described using a particular embodiment.

Figure 4:
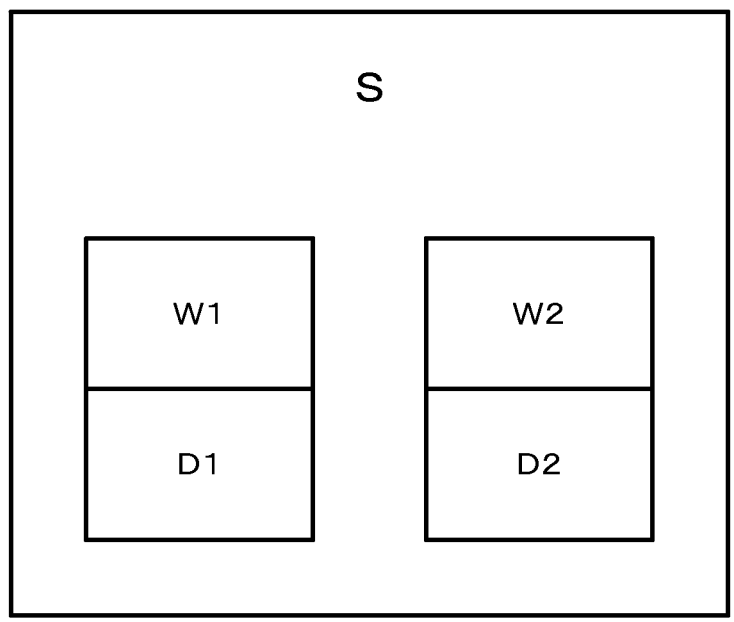
FIG. 4 is a diagram for explaining an embodiment.

In the present embodiment, assume a web system S consisting of two processing units, in which each of the processing units consists of a web server $W_1$ (resp. $W_2$) and a database server $D_1$ (resp. $D_2$). A configuration of the web system S is shown in FIG. 4.

It is assumed here that the web system S works when at least one of the two processing units is operational, and each processing unit does not work when either the web server or database server has failed.

System failure logic for the web system S is calculated by the failure logic means 110. The system failure logic for the web system S can be represented as:

$$S = (W_1 \lor D_1) \land (W_2 \lor D_2)$$

without considering imperfect coverage.

It is assumed that all components are operational in the initial state. All components are relevant in the initial state according to the definition of irrelevant component.

Assume that in a certain state, a fault occurs in the web server $W_1$, and the fault is covered by the component fault coverage means 120 as a permanent failure of $W_i$. Then, the system failure logic in this state (called $S_1$ with $W_1=1$) is evaluated as:

$$S_1 = S_{[W1=1]} = (1 \lor D_1) \land (W_2 \lor D_2) = W_2 \lor D_2$$

At that time, the irrelevant component coverage means 130 identifies the database server $D_1$ (used for supporting the web server $W_1$) as an irrelevant component. This is because D1 is now irrelevant in the state $S_1$, i.e., $$S_{1[D1=0]} = W_2 \lor D_2 = S_{1[D1=1]}$$

and the system failure logic for the web system S after covering the web server $W_1$ is independent of the presence or absence of a fault of the database server $D_1$.

Therefore, the database server $D_1$ should be isolated from the system by the irrelevant component coverage means 130, such that its future uncovered failures will not affect the system anymore.

It should be noted here that in the initial system state, as given by the system failure logic for the web system S:

$$S = (W_1 \lor D_1) \land (W_2 \lor D_2),$$

the database server $D_1$ is relevant in the system, and it becomes irrelevant when the web server $W_1$ is failed. Likewise, once the database server $D_1$ is failed, the web server $W_1$ becomes an irrelevant component. This can be applied also to the web server $W_2$ and the database server $D_2$.

Thus, based on the information from the system failure logic means 110 and the component fault coverage means 120, the identification and isolation of an irrelevant component are achieved by the irrelevant component coverage means 130.

Comparing the aforementioned embodiment with the conventional imperfect coverage model, only faulty components are isolated in the latter. For example, when the web server $W_1$ has failed and the failure is detected, only the web server $W_1$ is isolated after the coverage and the database server $D_1$ is left in the web system S without being isolated even when it becomes irrelevant after the failure of the web server $W_1$.

In contrast, in the present embodiment, not only is the faulty web server $W_1$ isolated but also the database server $D_1$ that becomes irrelevant by the failure of the web server $W_1$ (irrelevant component) is isolated, and consequently, potential future uncovered (single-point) failures from the database server $D_1$ can be prevented, so that reliability of the whole web system S can be improved.

While several components may be configured in hardware, they also may be implemented by a computer program, as is obvious from the preceding description. In this case, a processor that is operated by programs stored in a program memory implements functions and/or operations similar to those in the aforementioned illustrative embodiment or embodiment. It is also possible to implement part of functions of the aforementioned illustrative embodiment or embodiment by a computer program.

The aforementioned illustrative embodiment may be expressed as follows:

(Supplementary Note 1)

A fault-tolerant system comprising:

system failure logic means for editing system failure logic; and irrelevant component coverage means for identifying irrelevant components not having an effect on said system failure logic and isolating the irrelevant components based on said system failure logic provided by said system failure logic means.

(Supplementary Note 2)

The fault-tolerant system according to the supplementary note 1, comprising:

component fault coverage means for performing detection, recovery and isolation of a faulty component, and reconfiguration of the system, wherein said irrelevant component coverage means identifies and isolates said irrelevant component based on initial system failure logic and system failure logic after coverage of the faulty component provided by said system failure logic means, and information on the covered faulty component provided by said component fault coverage means.

(Supplementary Note 3)

A fault-tolerant method comprising:

editing and providing system failure logic; and identifying irrelevant components not having an effect on said system failure logic and isolating said irrelevant components based on said system failure logic.

(Supplementary Note 4)

The fault-tolerant method according to the supplementary note 3, comprising:

performing detection, recovery and isolation of a faulty component, and reconfiguration of the system, wherein said irrelevant component are identified and isolated based on initial system failure logic and system failure logic after coverage of the faulty component, and information on the covered faulty component.

(Supplementary Note 5)

A program for a fault-tolerant system, said program causing a computer to execute:

system failure logic processing of editing system failure logic; and irrelevant component isolation processing of identifying irrelevant components not having an effect on said system failure logic and isolating said irrelevant components based on said system failure logic.

(Supplementary Note 6)

The program according to the supplementary note 5, said program causing a computer to execute:

system reconstruction processing of performing detection, recovery and isolation of a faulty component, and reconfiguration of the system, wherein said processing of identifying and isolating said irrelevant component is processing of identifying and isolating said irrelevant component based on initial system failure logic and system failure logic after coverage of the faulty component by the system failure logic processing, and information on the covered faulty component provided by said system reconstruction processing.

As described above, according to the present invention, an irrelevant component (impertinent component) can be identified and isolated at an appropriate time in any system condition to prevent the occurrence of a single point of failure due to the irrelevant component (impertinent component), and as a result, reliability of a whole system can be improved.

This is because in a case that a certain component is an irrelevant component (impertinent component) that is impertinent or irrelevant, or becomes an irrelevant component (impertinent component) due to a fault of another component, the irrelevant component (impertinent component) is identified and isolated from a system by the irrelevant component coverage means. Therefore, any fault in an irrelevant component that may potentially occur and cannot be covered will not cause a single point of failure or affect the system in the future.

While the present invention has been described with reference to the preferred illustrative embodiment and embodiment in the preceding description, the present invention is not necessarily limited to the illustrative embodiment and embodiment described above, and several modifications may be made within a scope of the technical idea thereof.

The present application claims priority based on Japanese Patent Application No. 2011-258434 filed on Nov. 28, 2011, disclosure of which is incorporated herein in its entirety.

INDUSTRIAL APPLICABILITY

The present invention is used for management of reliability of a fault-tolerant system.

REFERENCE SIGNS LIST

110 Failure logic means
120 Component fault coverage means
130 Irrelevant component coverage means

The invention claimed is:

1. A fault-tolerant system comprising:
  system failure logic means configured to edit system failure logic representing the combinations of covered component failures that lead to system failure; and irrelevant component coverage means configured to identify irrelevant components not having an effect on said system failure logic and isolate the irrelevant components based on said system failure logic provided by said system failure logic means.

2. The fault-tolerant system according to claim 1, comprising:
component fault coverage means configured to perform detection, recovery and isolation of a faulty component, and reconfiguration of the system, wherein
said irrelevant component coverage means configured to identify and isolate said irrelevant components based on initial system failure logic and system failure logic after coverage of the faulty component provided by said system failure logic means, and information on the covered faulty component provided by said component fault coverage means.

3. A fault-tolerant method comprising:
editing and providing system failure logic representing the combinations of covered component failures that lead to system failure; and
identifying irrelevant components not having an effect on said system failure logic and isolating said irrelevant components based on said system failure logic.

4. The fault-tolerant method according to claim 3, comprising:
performing detection, recovery and isolation of a faulty component, and reconfiguration of the system, wherein said irrelevant component are identified and isolated based on initial system failure logic and system failure logic after coverage of the faulty component, and information on the covered faulty component.

5. A program for a fault-tolerant system, said program causing a computer to execute:
system failure logic processing of editing system failure logic representing the combinations of covered component failures that lead to system failure; and
irrelevant component isolation processing of identifying irrelevant components not having an effect on said system failure logic and isolating said irrelevant component based on said system failure logic;
wherein said program is stored on a non-transitory computer readable storage medium.

6. The program according to claim 5, said program causing a computer to execute:
system reconstruction processing of performing detection, recovery and isolation of a faulty component, and reconfiguration of the system, wherein
said processing of identifying and isolating said irrelevant component is processing of identifying and isolating said irrelevant component based on initial system failure logic and system failure logic after coverage of the faulty component by the system failure logic processing, and information on the covered faulty component provided by said system reconstruction processing.

* * * * *

UNITED STATES PATENT AND TRADEMARK OFFICE
CERTIFICATE OF CORRECTION

| | |
|---|---|
| PATENT NO. | : 9,053,023 B2 |
| APPLICATION NO. | : 14/360980 |
| DATED | : June 9, 2015 |
| INVENTOR(S) | : Jianwen Xiang |

It is certified that error appears in the above-identified patent and that said Letters Patent is hereby corrected as shown below:

Column 1, Line 10: Delete "Nov. 27, 2014," and insert -- Nov. 27, 2012, --

Column 4, Line 47: Delete "$W_i$." and insert -- $W_1$. --

Signed and Sealed this
Fifth Day of January, 2016

Michelle K. Lee
*Director of the United States Patent and Trademark Office*